Patented July 13, 1943

2,324,432

UNITED STATES PATENT OFFICE 2,324,432

COATING COMPOSITION AND METHOD OF PRODUCTION

Jacob M. Schantz, Wilmington, Del., assignor to Hercules Powder Company, Wilmington, Del., a corporation of Delaware No Drawing. Application March 30, 1942, Serial No. 436,842

7 Claims. (Cl. 106—222)

This invention relates to improved coating compositions and to methods for their production, and more particularly to coating compositions containing polyhydric alcohol esters of resin acids and to methods for their production.

Varnishes containing polyhydric alcohol esters of rosin, such as ester gum, are an important article of commerce. Heretofore, these varnishes have contained esters produced by esterifying rosins of high neutral body content. Ordinarily wood rosin, for example, has a neutral body content of at least about nine per cent by weight. These neutral bodies are not removed in the esterification reaction, and consequently are to be found in the finished varnish compositions. It is believed that certain of the undesirable properties of such varnishes, such as their characteristics of turning dark in the cooking operation and of discoloration upon baking, are due in large part to the presence of the neutral bodies in the rosin esters used in the varnish cooking.

Various attempts have been made to prepare varnishes containing rosin esters which do not suffer from the defects mentioned in the previous paragraph. Varnishes prepared using hydrogenated rosin esters do not degrade in color during cooking or upon baking, but the use of these materials has been restricted because of the expense of hydrogenation apparatus and catalysts. Varnishes have also been prepared from rosin esters produced from distilled rosins. Such varnishes are not superior to varnishes prepared from ordinary rosin esters, however, since distillation does not remove the neutral bodies and as a result they are to be found in the finished varnish composition.

Now, in accordance with this invention, coating compositions of improved color stability upon cooking and baking and of increased alkali resistance are prepared by the use of a polyhydric alcohol ester of a crystallized rosin acid having a neutral body content below about two per cent by weight and an acid number above about 181. It has been found, in accordance with this invention, that these improved compositions result from the use of an ester of a crystallized rosin acid of the defined low neutral body content and high acid number. The cooking time of the varnishes is also decreased over that required with the prior esters. Moreover, the varnishes of this invention dry dust free in a shorter period than those produced by the prior art, and the films produced by the drying of the former are considerably more resistant to alkali.

The crystallized rosin acids of the foregoing characteristics may be obtained from either wood or gum rosin. For example, they may be prepared by precipitation from solution of the rosin in an inert organic solvent, and separating a crystallized rosin acid of the necessary properties. The crystallized rosin acids may also be prepared according to the method described in an application, Serial Number 385,415, filed March 27, 1941, by Richard F. B. Cox.

Having now indicated in a general way the nature and purpose of this invention, the following specific examples are offered to illustrate the preparation of the improved coating compositions. In the examples, the term "parts" represents weight units unless otherwise indicated.

Example 1

A varnish composition was prepared according to the following procedure: A reaction mixture consisting of 169 parts of pentaerythritol and 1445 parts of rosin crystals (prepared by crystallization from solution of N wood rosin in ethyl alcohol and wet with about three per cent by weight of ethyl alcohol), having an acid number of 183 and a neutral body content of less than one per cent by weight, was heated for 13 hours at 285° C., and the resin thus formed was sparged with nitrogen gas at 285° C. for a further period of ¾ hour. This procedure yielded a resinous product having an acid number of 16, a drop melting point of 125° C., and a Lovibond color of 4 Amber. A varnish composition was then prepared as follows: Two hundred fifty parts of the resin previously prepared and 500 parts of Z3+ bodied linseed oil were heated to 585° F. in about one hour and held at that temperature for about four hours. The mass was then permitted to cool to about 450° F. and thinned with mineral spirits to a finished varnish composition containing 50% by weight solids, having a Gardner-Holdt viscosity of B+ and a Hellige color of 2L. Naphthenate driers were then added to give a composition containing 0.2% by weight of calcium, 0.1% by weight of lead, and 0.07% by weight of cobalt, based upon the oil content of the varnish. This varnish composition set dust free in two hours and tack free to aluminum foil in 7 hours and 45 minutes. A dry film of this varnish was exposed to a one per cent by weight aqueous sodium hydroxide solution for one hour, and after the solution was removed the varnish film showed only a slight blush. A comparison varnish was prepared in the same manner except that the ester used had been prepared from N wood rosin. This comparison varnish required a considerably longer time to set dust free and blushed very badly when subjected to the alkali test.

Example 2

A resin was prepared from 210 parts of dipentaerythritol and 145 parts of the rosin crystals employed in Example 1 according to the procedure of Example 1. This resin had an acid number of 14, a drop melting point of 133° C., and a Lovibond color of 4 Amber. A varnish composition was then prepared according to the procedure followed in Example 1, using 250 parts of the resin and 500 parts of Z3+ bodied linseed oil. After cooling and thinning, as described in Example 1, a varnish composition having a Gardner-Holdt viscosity of E and a Hellige color of 2L was obtained. This varnish, containing the driers as in Example 1, set dust free in two hours and tack free to aluminum in seven hours, and a dry film of this varnish was absolutely unaffected by exposure to a one per cent by weight aqueous sodium hydroxide solution for two hours. A comparison varnish was also prepared using an ester prepared in the same manner from N wood rosin, but this varnish was characterized by a much darker color, decreased viscosity, and much poorer alkali resistance than the varnish prepared using the rosin crystals.

Example 3

A varnish composition was prepared by heating 100 parts of the resin prepared in Example 2 and 240 parts of dehydrated castor oil at 580° F. for 55 minutes. This mixture was then checked with 100 more parts of the above resin, and the mass then heated at 550° F. for an additional ten minutes. The composition was thinned with mineral spirits to a solution containing 50% by weight solids, having a Gardner-Holdt viscosity of B and a Hellige color of 2L. This varnish, too, possessed a lighter color, increased viscosity, and better alkali resistance than a comparison varnish prepared from N wood rosin instead of the crystallized rosin acids.

Example 4

A varnish composition was prepared by first heating 100 pounds of the resin prepared in Example 1 and 15 gallons of Z3 bodied dehydrated castor oil to 585° F. in 45 minutes and holding the mixture at this temperature for 40 minutes. Ten gallons of tung oil were then added and the temperature was held at 575° F. for ten minutes. After this, the temperature was permitted to drift to 550°–560° F. and held there for ten minutes to produce the proper body. When cooled and thinned with mineral spirits to a composition containing 50% by weight solids, this varnish had a Gardner-Holdt viscosity of G and a Hellige color of 1. This varnish also was characterized by the remarkably light color, by the high alkali resistance, and by the short drying times of its films.

Example 5

A resin having a drop melting point of 123° C., an acid number of 15, and a Lovibond color of 7 Amber was prepared according to the procedure of Example 1 by the use of 1500 parts of rosin crystals (prepared by crystallization from solution of N wood rosin in ethyl alcohol and wet with about four per cent by weight of ethyl alcohol) having an acid number of 182 and a neutral body content of about one per cent by weight and 180 parts of pentaerythritol. From this resin, a varnish was prepared by heating 500 parts of the resin and 120 parts of Z2 bodied dehydrated castor oil at 600° F. for one hour. Fifty more parts of the resin were then added and the entire mixture was heated at 560° F. for ten minutes. The solution was then cooled to 450° F. and thinned to 50% by weight solids with a diluent comprising two parts of V. M. and P. naphtha and one part of mineral spirits. The finished varnish had a Gardner-Holdt viscosity of B and a Hellige color of 3A. This varnish exhibited greatly superior qualities than a comparison varnish prepared from N wood rosin instead of the rosin crystals.

Example 6

A resin was prepared by heating simultaneously 100 parts of the rosin crystals employed in Example 5, 3½ parts of maleic anhydride, and 14 parts of pentaerythritol at 285° C. for 15 hours. Fifty pounds of this resin and 15 gallons of Z2 bodied dehydrated castor oil were heated to 600° F. in 40 minutes and the mixture was then held at this temperature for a further period of 35 minutes. A further portion of 50 pounds of the resin was then added and the temperature was held at 560° F. for ten minutes. After this, the mixture was cooled and thinned as in Example 1 with mineral spirits to a composition containing 50% by weight solids, thus producing a varnish composition having a Hellige color of 2. A comparison varnish was also prepared using N wood rosin in place of the rosin crystals. This varnish had a lower viscosity and a considerably darker color than the varnish prepared using the rosin crystals. Again, a varnish of greatly superior qualities was produced in comparison with a varnish prepared from N wood rosin.

Example 7

A 15 gallon oil length varnish was made containing an ester of rosin crystals and dipentaerythritol according to the procedure followed in Example 5, except that the hold time at 600° F. was 50 minutes. The finished composition containing 50% by weight solids had a Gardner-Holdt viscosity of D and a color of 1 Hellige. This varnish, too, was characterized by fast drying time and the light color and alkali resistance of its films.

Example 8

A coating composition was made by first heating 100 pounds of the resin described in Example 6 and 10 gallons of dehydrated castor oil to 585° F. in 45 minutes and holding the mixture at that temperature for a further period of 45 minutes. Five gallons of tung oil were then added and the composition was held at 575° F. for from 10 to 15 minutes. The mixture was then cooled and thinned with mineral spirits to a composition containing 50% by weight solids. The varnish produced had a Gardner-Holdt viscosity of F and a Hellige color of 1, and was characterized by excellent color retention upon exposure to ultraviolet light and by excellent baking properties.

Example 9

A resin was prepared by a procedure similar to that employed in Example 1 by reacting 1000 parts of the crystallized rosin acids used in Example 1 with 11½ parts of glycerol at 285° F. for 15 hours in an inert atmosphere. The finished resin had a drop melting point of 108° C., an acid number of 6.7, and a Lovibond color of 5 Amber. This resin was employed as follows in a varnish composition: One hundred pounds of the resin and 10 gallons of dehydrated castor oil were heated to 585° F. in 45 minutes and held at this temperature for a like period. Fifteen gallons of tung oil were added and the mixture was held at 575° F. for ten minutes, after which the composition was cooled to 560° F. and held for body. This oleoresinous base was thinned with mineral spirits to a solution containing 50% by weight solids, thus yielding a varnish having a Gardner-Holdt viscosity of D and a Hellige color of 2. This varnish had excellent air-drying and baking characteristics, and the dried film retained its color exceptionally well upon being subjected to the action of ultraviolet light. A comparison varnish was also prepared using an ester prepared in the same manner from N wood rosin. This comparison varnish, however, had a much darker color, a lower viscosity, and greatly inferior baking characteristics in comparison with the varnish prepared from the rosin crystals.

Example 10

Enamel compositions were prepared as follows using the vehicles of Example 9: One hundred parts of the vehicle and 100 parts of titanium oxide were ground thoroughly on a roll mill and the paste was then mixed with 100 parts more of the vehicle. Air-dry enamels and bake-dry enamels were made containing 0.3% by weight of lead and 0.05% by weight of cobalt, and 0.015% by weight of calcium, respectively. Enamel coatings obtained from the air-dry enamels and from the baked-dry enamels prepared from both rosin crystals and N wood rosin were subjected to the action of an ultraviolet arc. This test showed the enamel films obtained from enamels prepared from rosin crystals exhibited much greater resistance to the discoloring action of ultraviolet light than the films obtained from enamels prepared from N wood rosin. Furthermore, the enamel films obtained from compositions prepared from the rosin crystals had increased resistance to discoloration in high humidities than did the films obtained from compositions prepared from N wood rosin.

Example 11

A varnish resin was prepared by melting 500 parts of the rosin crystals employed in Example 5 in an inert atmosphere at 110° C. Fifty parts of maleic anhydride were then added and the temperature was raised to 230° F. in 50 minutes, at which point the mixture was held for a further period of one hour. One hundred five parts of glycerol were then reacted with the rosin-maleic anhydride adduct at 285° C. for 12 hours. After sparging with carbon dioxide gas, a resin having an acid number of 14, a Lovibond color of 10 Amber, and a drop melting point of 138° C. was produced. A varnish composition was then prepared from this resin by heating 250 parts of the resin and 500 parts of Z3 body heat-kettled linseed oil to 585° F. in 40 minutes and holding the mixture at that temperature for five hours. The solution was cooled to 450° F. and thinned with mineral spirits to contain 50% by weight solids. This varnish had a Gardner-Holdt viscosity of C and a Hellige color of 1. Naphthenate driers were then added in such amounts as to produce 0.5% lead and 0.07% cobalt in the finished varnish, based upon the weight of the oil present. This varnish dried dust free in 2½ hours and tack free to aluminum foil in 8½ hours.

As shown in the examples, the improved coating compositions are prepared according to the cooking procedures usually employed in the art. The method of preparation comprises heating an oil and a polyhydric alcohol ester of a crystallized rosin acid at such a temperature for such a period of time as to produce a composition of the desired viscosity and degree of polymerization. In place of the cooking temperatures of from 560 to 600° F. shown in the examples, there may usually be employed any temperature from about 500 to about 600° F., depending upon the particular composition being cooked, but preferably the range between about 560 and about 600° F. is employed in cooking. The cooking time depends primarily upon the cooking temperature and the oil used, and usually ranges from 15 minutes to four hours. Preferably the cooking time is less than 2½ hours at 585° F. After the ingredients of the cooking kettle have been sufficiently heated, the mixture may then be permitted to cool somewhat and thinner added.

The improved varnish compositions may be prepared from rosin crystals having a neutral body content below about two per cent by weight and an acid number above about 181, obtained from either wood or gum rosin. Thus, the rosin crystals employed in the examples were obtained by preparing a saturated solution of rosin in hot ethyl alcohol. Upon cooling the solution, rosin crystals separated and they were then separated from the mother liquor by filtration and centrifuging. Suitable crystals may also be prepared by precipitation from solution in isopropyl alcohol, acetone, etc. Crystallized rosin acids may also be prepared according to the method described in an application, Serial No. 385,415, filed March 27, 1941, by Richard F. B. Cox, which comprises commingling an alkali metal abietate with rosin to form an acid abietate, contacting the acid abietate with a polar solvent for alkali abietate and a nonpolar solvent for abietic acid immiscible with a polar solvent, separating the phases, and recovering a resin acid having neutral body content not greater than about two per cent by weight and an acid number above about 181 by crystallization from the nonpolar solvent.

Resins prepared from suitable rosin crystals and any polyhydric alcohol may be employed in the production of the improved varnish compositions. Thus, in place of the pentaerythritol, dipentaerythritol, and glycerol used in the examples, there may be employed ethylene glycol, diethylene glycol, triethylene glycol, propylene glycol, butylene glycol, trimethylene gycol, tetramethylene glycol, diglycerol, sorbitol, mannitol, etc., or mixtures thereof.

The coating compositions may comprise any of the drying or semi-drying oils employed in the art in the preparation of varnish compositions. Thus, in addition to the dehydrated castor oil, bodied linseed oil, and tung oil shown in the examples, there may be used perilla oil, oiticica oil, soybean oil, fish oil, etc. or any of these oils in their modified forms, such as blown oils, bodied oils, segregated oils, etc. The drying or semi-drying oil is employed in those amounts generally used in preparing varnish compositions and usually may comprise between about 25 and about 90% by weight, and preferably between about 45 and about 80% by weight, of the oleoresinous base.

Any of the thinners usually employed in practice may be used for diluting the oleoresinous base. V. M. and P. naphtha, and mineral spirits were employed in the examples. Turpentine, benzol, toluol, xylol, Hi-flash naphtha, Solvesso Nos. 1, 2, 3, and 4, etc. or any other desirable thinner may also be used. The amount of thinner added to the oleoresinous base will depend upon the viscosity desired in the finished coating composition, but preferably the coating composition will contain between about 45 and about 55% by weight of thinner.

The improved coating compositions will also preferably contain drying agents such as the resinates, naphthenates and linoleates of zinc, cobalt, lead, calcium and manganese and these salts are preferably employed in the proportions usually employed in the art. Where it is desired to produce an enamel composition, suitable pigments may be ground into the thinned varnish either before or after the addition of the drier, as shown in Example 10.

Coating compositions prepared as described herein constitute improved varnishes and have marked advantages. Varnish compositions containing polyhydric alcohol esters of crystallized rosin acids are characterized by extreme lightness in color due to the stability of the esters when subjected to the high temperatures employed in cooking. Furthermore, the varnish bases produced according to this invention can be used in the production of enamel compositions, particularly white enamels, which exhibit excellent color stability when baked to produce a hard finish. Also, the varnishes produced according to this specification show excellent color stability when subjected to natural light, ultraviolet light, weather, and to the action of dilute alkalies.

What I claim and desire to protect by Letters Patent is:

1. A coating composition characterized by low color, by high color stability, and by high alkali resistance, comprising a heat-bodied mixture of a drying oil and a polyhydric alcohol ester of a crystallized rosin acid having a neutral body content below about two per cent by weight and an acid number above about 181, formed by heating said mixture at a temperature between about 500° F. and about 600° F.

2. A coating composition characterized by low color, by high color stability, and by high alkali resistance, comprising a heat-bodied mixture of a drying oil and the glycerol ester of a crystallized rosin acid having a neutral body content below about two per cent by weight and an acid number above about 181, formed by heating said mixture at a temperature between about 500° F. and about 600° F.

3. A coating composition characterized by low color, by high color stability, and by high alkali resistance, comprising a heat-bodied mixture of a drying oil and the pentaerythritol ester of a crystallized rosin acid having a neutral body content below about two per cent by weight and an acid number above about 181, formed by heating said mixture at a temperature between about 500° F. and about 600° F.

4. A coating composition characterized by low color, by high color stability, and by high alkali resistance, comprising a drying oil, a thinner, and a polyhydric alcohol ester of a crystallized rosin acid having a neutral body content below about two per cent by weight and an acid number above about 181, the oil and the ester being bodied together by heating at a temperature between about 500° F. and about 600° F.

5. A coating composition characterized by low color, by high color stability, and by high alkali resistance, comprising a drying oil, a thinner, a drier, and a polyhydric alcohol ester of a crystallized rosin acid having a neutral body content below about two per cent by weight and an acid number above about 181, the oil and the ester being bodied together by heating at a temperature between about 500° F. and about 600° F.

6. A coating composition characterized by low color, by high color stability, and by high alkali resistance, comprising a drying oil, a thinner, a drier, a pigment and a polyhydric alcohol ester of a crystallized rosin acid having a neutral body content below about two per cent by weight and an acid number above about 181, the oil and the ester being bodied together by heating at a temperature between about 500° F. and about 600° F.

7. The method of preparing a varnish base which comprises heating a drying oil and a polyhydric alcohol ester of a crystallized rosin acid having a neutral body content below about two per cent by weight and an acid number above about 181 at a temperature between about 500 and 600° F.

JACOB M. SCHANTZ.